United States Patent [19]
Ellis

[11] 4,450,697
[45] May 29, 1984

[54] SECURITY DEVICES FOR ROTATABLE MEMBERS AND FLUID FLOW CONTROL VALVES INCORPORATING SUCH DEVICES

[76] Inventor: Alan E. H. Ellis, 14 Scott Dr., Lexden, Colchester, England

[21] Appl. No.: 300,907

[22] Filed: Sep. 10, 1981

[51] Int. Cl.³ .............................................. G05G 5/00
[52] U.S. Cl. ...................................... 70/178; 70/363
[58] Field of Search ................ 70/175, 176, 177, 178, 70/179, 363, 404; 137/383, 385

[56] References Cited
U.S. PATENT DOCUMENTS

| 414,154 | 10/1889 | Haines | 70/176 |
| 1,534,965 | 4/1925 | Keeler | 70/404 |

Primary Examiner—Robert L. Wolfe
Attorney, Agent, or Firm—McGlew and Tuttle

[57] ABSTRACT

A security device for a rotatable member of a machine element, such as the spindle or nut of a fluid-flow control valve, to prevent the unauthorized operation thereof. A turning member having a cylindrical surface is fitted to the valve spindle and a shroud is rotatably mounted on the member, the shroud having lugs which engage parts of the valve to prevent rotation of the shroud when the device is fitted to the valve. Projections upstand from the cylindrical surface and the turning member can be operated only by a key able to fit within the shroud and over the cylindrical surface, with recesses appropriately positioned to accommodate the projections, such that torque can be imparted to the turning member through the interengagement of at least one projection with a wall of the key defining the associated recess.

A locking device including a pin spring-urged out of a bore in the base of the shroud may engage an appropriate recess in the turning member, further to enhance security. Such a lock may only be released by use of the appropriate key, to press the pin downwardly to move free of the turning member.

The security device may be modified for use with a rising stem fluid-flow control valve, and furthermore may be arranged to hold the key in the shroud until the valve has been set to one extreme position either fully open or fully closed.

17 Claims, 4 Drawing Figures

SECURITY DEVICES FOR ROTATABLE MEMBERS AND FLUID FLOW CONTROL VALVES INCORPORATING SUCH DEVICES

BACKGROUND TO THE INVENTION (a) Field of the Invention

This invention relates to a security device for a member which projects from a machine element and which is to be rotated from time to time. The security device of the invention is to render the member secure against rotation by those not authorised to effect rotation thereof—that is, to make it difficult if at all possible for those not authorised to effect said rotation. The device of the invention is particularly suitable for use in conjunction with fluid-flow control valves, and especially rising stem valves, and the invention extends to rising stem fluid-flow control valves fitted with security devices of this invention.

(b) Description of the Prior Art

There are many circumstances in which a rotatable member projects from a machine element and is to be rotated from time to time—but which is to be rotated only by those specifically authorised to do so. For example, many fluid-flow control valves are provided with a rotatable member which actuates the valve itself and which is to be operated only by those competent or empowered to do so. Similarly, certain types of electrical switchgear have rotatable parts which effect operation of the switch contacts to cause switching of electric current and again must not be operated other than by those duly authorised. In these two examples, the machine element from which the rotatable member projects would comprise the valve housing (in the former case) and the switch body (in the latter case).

Especially with electrical switchgear, various forms of key-locks have been designed to prevent actuation by unauthorised people. These locks are usually tumbler or plunger locks actuated by conventional keys—but it is difficult to arrange for such a lock directly to actuate a switch which may require a large torque for its operation. In the gas supply industry, quite apart from the fraudulent operation of a valve, it can at times positively be dangerous for a valve to be turned on once turned off, and so quite apart from reasons of fraud, various locking arrangements for gas valves have been devised. These include key-operated arrangements, but instead of the use of a tumbler or plunger type of lock as mentioned above when referring to electrical switchgear, it is more usual to employ a separate lock such as a conventional padlock.

OBJECTS OF THE INVENTION

It is a principal object of this invention to provide a security device for a rotatable member such as a part of a valve or switch, whereby rotation of the member by an unauthorised person can be prevented or at least made very difficult, so as to reduce the likelihood of fraudulent dangerous or other actuation of a component controlled by the member.

It is a further object of this invention to provide a security arrangement for a valve for fluid-flow control, which arrangement serves to allow the valve to be operated by a conventional tool until the valve has been set to a particular position (typically closed) whereat the valve is locked and can thereafter be operated only by the use of a key especially adapted to the valve.

Another object of this invention is to provide a security arrangement for a rising stem fluid-flow control valve, which is designed to hold the key therefor unless the valve is set to one or another extreme position—thus open, or closed.

SUMMARY OF THE INVENTION

According to the broadest aspect of the invention, there is provided a security arrangement for a rotatable member of a machine element, e.g. an existing otherwise exposed and accessible rotatable member which projects from the machine element and which is not protected by a security arrangement, which arrangement comprises a rotatable stub for attachment to the rotatable member to impart drive thereto, the stub defining an external cylindrical surface and there being at least two arcuately-spaced projections upstanding radially from said cylindrical surface, and a shroud adapted to surround with clearance said cylindrical surface of the stub and said projections upstanding therefrom, the shroud being provided with means to secure said shroud against rotation with respect to said machine element when said security arrangement is fitted thereto, whereby said stub may be engaged by an operating key having a cylindrical portion defining a bore which may fit over said cylindrical wall, said key also defining recesses angularly spaced for receiving said projections and the outer diameter of said cylindrical portion of the key being sufficiently small to fit within said shroud so that rotation of the stub may be effected by the key driving the stub by the interengagement of at least one of the projections with the wall of said key defining the recess receiving said projection.

A particularly preferred aspect of the invention consists of the combination of a machine element in the form of a rising stem fluid-flow control valve, the rotatable stub comprising a nut for the rising stem and the key having a through-bore in which the rising stem can be accommodated as the valve is opened, in which said key is provided with a movable detent located in a generally radial bore through a side wall of said key and engageable in an annular groove in the internal wall of said shroud, there being detent operating means which maintains the detent engaged with the annular groove when said key is fitted over the cylindrical surface and the valve is not at said extreme setting but allows the detent to move out of engagement with the groove when the stem is at its said extreme setting.

It will be appreciated that the security arrangements of this invention may give a high degree of security, insofar as the machine element may be operated only by turning the rotatable stub, and yet that stub is surrounded by a non-rotatable shroud greatly restricting access to the stub, so that a key especially adapted to the combination of the shroud and stub must be used to operate the stub.

Further objects and advantages of the present invention will become apparent from the description set out hereinafter of various preferred aspects of the invention and of three specific embodiments thereof.

BRIEF DESCRIPTION OF THE DRAWINGS

By way of illustration of the invention, three specific embodiments of preferred aspects thereof will be described hereinafter in detail, referring to the accompanying drawings, in which.

DESCRIPTION OF THE PREFERRED EMBODIMENTS

Figure 1:
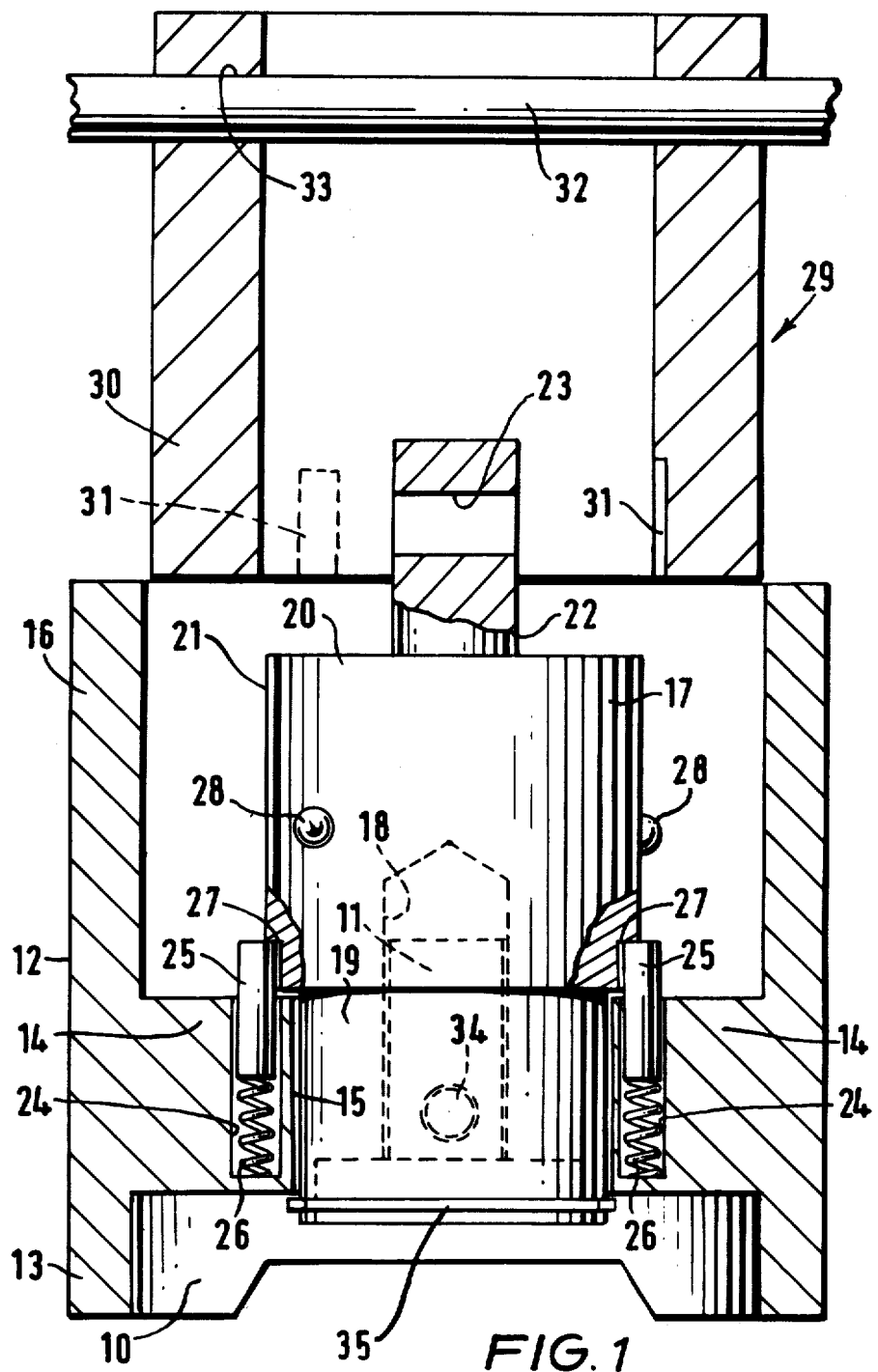
FIG. 1 is a vertical cross-sectional view through a first embodiment of this invention, intended primarily for use with a gas ball valve requiring 90° of movement between the fully open and fully closed positions.

The shroud which non-rotatably surrounds the rotatable stub is preferably tubular in form with an annular cross-section, though it may be provided with an internal or an external mounting flange allowing the shroud to be attached to the machine element. Though the shroud may be adapted for mounting either directly or indirectly on the machine element, it should be attached in such a way that it is not readily detachable to expose the stub. For example, the shroud could be attached to the machine element permanently, for instance by welding, or could be provided with threaded holes for engagement by screws projecting outwardly from within the machine element. Another possibility described in detail below is for the shroud to be attached indirectly on the machine element by mounting the shroud on the rotatable stub, a member (such as a circlip) being provided on the rotatable stub to retain the shroud on the stub when fitted to the machine element such that the shroud may be removed only when said member has been removed—and this can be arranged to require the use of the driving key engageable therewith.

The radial projections provided on the cylindrical surface may have a considerable axial extent—in which case they would essentially comprise ribs—or they may be of relatively small axial extent and be provided on the cylindrical surface part-way between the ends thereof. In one preferred embodiment, each projection is in the form of a hemisphere and comprises the head of a rivet-like element pressed into a suitable aperture provided radially in the cylindrical surface, but in a second preferred embodiment each projection is of cylindrical form let into a counter-bore provided radially in the cylindrical surface.

It will be appreciated that greater security for a particular application can be obtained by coding the projections: that is, on a series of similar security devices of this invention by providing the projections at different angular spacings. In this way, a key designed to operate one particular security device would not be suitable for operating another. Furthermore, by providing three or even more projections on the cylindrical surface, the number of coded combinations obtainable can greatly be increased.

In a preferred embodiment of security device of this invention, locking means are provided to lock the rotatable stub against rotation relative to the shroud when the stub has been turned to a particular disposition with respect to the shroud, which means are releasable only upon actuation by the appropriate driving key, which should be the same driving key as is used normally to rotate the stub. Such an arrangement finds particular application with fluid-flow control valves or with switchgear which may require to be turned to one setting—for instance 'off'—by any person but once turned to that setting to be locked there and then only movable back to the original setting by a person possessing the appropriate key. For example, in the case of a valve for gas flow having a rotatable stub movable through 90° to open or to close the valve, the stub may be provided with a boss projecting axially beyond the shroud when mounted on the valve body, which boss is formed so as to be drivable by a conventional tool. The boss may thus have a hexagonal form for rotation by a conventional spanner, or may have a diametral hole for engagement by a tommy-bar. By appropriate disposition of the locking means for the rotatable stub, the stub may be rotated from the 'on' setting to the 'off' setting by means of a suitable tool engaged with the boss, but once moved to the 'off' setting the stub is locked there against further rotation until the key engageable with the cylindrical portion is employed.

In the above-described embodiment, one particularly convenient form of locking means comprises at least one pin positioned in a bore extending parallel to the axis of the rotatable stub and provided in an appropriate part of the shroud, the pin being resiliently biassed out of its bore for engagement in a recess formed in the cylindrical surface when the rotatable stub has been rotated to the correct relative disposition. Preferably, the pin is of a circular cross-section and is engageable in a recess of semi-circular section in the cylindrical surface, which recess extends parallel to the axis of the stub so that the pin, when in the recess, also projects radially beyond the cylindrical surface. When the key is engaged with the cylindrical surface to rotate the stub, axial pressure on the key will cause the end face thereof to engage and drive the pin against its resilient bias back into the recess; when the pin is completely clear of the recess, the rotatable stub may be turned by means of the key.

The above-described security device may be modified to allow the stub to be locked at any one of a relatively large number of angular positions with respect to the shroud (or machine element). By providing a plurality of closely-spaced recesses around the cylindrical portion, the pin may engage in any one recess, and lock the stub at that position. In this way, a machine element (such as a valve) may be regarded as proofed against vibration. Moreover, if the machine element is to be set to one of a number of predetermined settings only, such a multiple position locking arrangement may serve to code the position of the stub. For instance, a fluid control flow valve fitted with such an arrangement may be used to code the position of the stub—for instance 24 recesses in the stub would give 24 discrete locked positions. The number of positions available may be increased for example by providing two pins, the angular spacing of which is not a multiple of the angular spacing of the recesses. Thus, if n recesses are provided, a second pin may be spaced by 180° from the first pin if n is odd, but if n is even, the second pin should be spaced by:

$$180° \pm (180/n)°;$$

this gives 2n equi-spaced locking positions.

The rotatable stub having the cylindrical surface may comprise a part of the rotatable member of the machine element itself, or may be formed as a part separate from but adapted for attachment to the rotatable member. In a preferred embodiment, the rotatable stub is formed as a separate turning member which may be non-rotatably locked on to the rotatable stub, for instance by a screw-threaded fastener. In one embodiment, the fastener comprises a grub-screw threaded into a radially-extending bore provided in the stub. For this embodiment, an aperture should be provided in the shroud for access to the grub-screw such that the grub-screw may be turned only when the stub has been rotated to a particular disposition relative to the shroud, by means of the driving key.

Other preferred embodiments of this invention are intended for use primarily with a fluid-flow valve requiring a plurality of turns of a part thereof either fully to open the valve from the closed setting or completely to close the valve from the open setting.

A type of fluid-flow control valve requiring several turns between its extreme settings is the so-called 'rising stem valve' and these are widely used in pipework installations. Such a valve typically has a valve body in which is mounted a valve member arranged for sliding movement transverse to the axis of a passage formed through the valve body, the valve member being connected to a screw-threaded stem engaged with a nut suitably mounted for rotation on the valve body but held against movement along the axis of the stem. Usually, a handwheel is mounted on the nut to allow the nut to be rotated, thereby to drive the threaded valve stem and hence the valve member to open or to close the valve, depending upon the sense of rotation of the nut.

When a rising stem fluid-flow control valve is closed, the free end of the rising stem normally lies closely adjacent the nut; to open the valve from this setting the nut is rotated in the appropriate sense to cause the stem to project by a greater extent from the nut, thus moving the valve member to open the passage through the valve body. When the valve is fully opened, the stem projects through the nut by the greatest amount.

In a pipe-line installation containing several rising stem fluid-flow control valves, it is often the case that any particular valve may be opened or perhaps closed only when some other valve is in a particular setting—either opened or closed, as appropriate. For example, in the simplest case of an installation having but two valves, it may be that when one valve is to be opened, the other must first be closed, and vice-versa. In the past, it has been necessary to rely upon the workman ensuring that the correct sequence of valve operation occurs. Moreover, to prevent the operation of the valves by unauthorised personnel, not uncommonly the valve wheels are locked for instance by means of a chain and padlock, and the use of padlocks with different keys has been employed in an attempt to ensure workmen do not operate the valves in an impermissible sequence, for example by insisting on a workman returning to a store one padlock key before issuing another key. However, such a system offers very little security against maloperation, and in any event just because a handwheel is locked by means of a chain and padlock, there is no guarantee that the valve wheel has been locked with the valve in its correct setting.

The specific embodiments of this invention to be described below are intended for use with such rising stem fluid-flow control valves and serve to prevent withdrawal of an operating key for the valve only when the valve is at one or the other of its extreme settings, depending upon the particular arrangement of the security device, the key at all other times being held captive so as to prevent its use in operating other valves.

Irrespective of the valve setting where the key is to be freed, it is preferred for the key to be provided with a through-bore into which the rising stem may pass when the device is fitted to a valve, and with movable detent means located in a generally radial bore through a side wall of the key which means is engageable in an annular groove in the internal wall of the shroud, there being a detent drive member which maintains the detent means engaged with the annular groove when the key is fitted on the cylindrical surface of the turning member and the valve is not at the extreme setting where the key is to be released, but allows the detent means to move out of engagement with the groove when the valve is at the extreme setting.

For a rising stem valve in which the key is to be removable only when the valve is fully open, the detent drive member may comprise a sleeve which fits over the rising stem of the valve and is biassed to a position in which it maintains engagement between the detent means and the annular groove in the shroud, the end of the sleeve nearer the free end of the rising stem of the valve being provided with an abutment face for engagement with the free end of the rising stem so that as the stem rises it will engage and lift the sleeve to move the sleeve to a position in which the detent means may move out of the groove in the shroud.

Further means may be provided to maintain the detent means in a position in which the key may be fitted within the shroud before the key has properly been engaged with the cylindrical portion of the turning member. For instance, a collar may be provided on the key to hold the detent radially inwardly until the key has been fitted whereafter the collar moves free of the detent means allowing the detent to move radially outwardly into the groove in the shroud, except when the valve has been adjusted to said extreme setting.

For a rising stem valve in which the key is to be removable only when the valve is fully closed, the detent drive member may have a section able to fit into a through-bore in the key through which the rising stem may pass, said section having a first portion of substantially the same diameter as the stem of the valve and a second portion defining an annular channel for receiving the detent means when not projecting beyond the outer periphery of the key, the detent drive member being adjustable to allow pre-setting of the distance between the annular channel of the detent drive member and the end face of said section thereof, the arrangement being such that when the device is fitted to a rising stem valve, said end face of the detent drive member is engaged and moved by the rising stem as the turning member is operated by the key to open the valve from its fully closed setting, thereby moving the detent means to restrain withdrawal of the key from the shroud.

The just-described embodiment of security device of this invention has the key retained within the shroud in engagement with the turning member whenever the valve is other than in its closed setting, because when the valve is partially or fully open, the valve stem projects from the nut by an extent greater than at the valve-closed setting, thus lifting the detent drive member such that the detent means is driven thereby out of the channel in the detent drive member and into the groove in the shroud. Conversely, as the valve is operated to its closed setting, the annular channel in the detent drive member comes into register with the detent means, allowing the detent means to move out of the groove in the shroud into the detent drive member channel, thus freeing the key and allowing its removal from the valve to which the security device is fitted.

In order to prevent unauthorised operation of the detent drive member it is preferred for the key to include an elongate axial housing which is able to accommodate both the rising stem of the valve, whatever the setting of the valve, and the detent drive member, which is engaged and lifted by the rising stem of the valve. To ensure that the detent drive member always is maintained in contact with the free end of the rising stem, it is preferred for there to be a compression spring disposed between the detent drive member and the end of the housing disposed furthest from the main body of the key.

Tests on relatively large scale rising stem fluid-flow control valves have shown that the manufacturing tolerances are such that for different samples the precise relative disposition between the free end of the rising stem and a datum on the valve body tend to vary by quite a large amount, for any given setting of the valve—for instance, closed. Accordingly, it has been proved necessary to provide this particular type of security device of this invention with means to accommodate these differences in manufacturing tolerances, whereby alignment of the annular channel in the detent drive member with the detent means can be assured when the valve is fully closed, so as to allow the key to be removed at that setting. A preferred form of detent drive member comprises a first component in the form of a threaded stub having formed at one end thereof a head adapted to fit within the through-bore in the key and to be engaged by the free end of the rising stem of the valve, and a second component having a screw-threaded bore engaged with the threaded stub of the first component and having a boss which also fits within the through-bore in the key, the boss defining the annular channel of the detent drive member. Adjustment may then be effected by turning the first component with respect to the second component, and such adjustment should be performed during the initial installation of the security device on a rising stem valve. Then, a spacer of an appropriate thickness should be provided between the head at the end of the first component and the boss of the second component, which spacer has substantially the same diameter as the head so as to prevent erroneous operation of the detent means when the detent drive member is lifted by the rising stem to such an extent as the spacer is aligned with the detent means.

The detent means in either of the two possible configurations of security device for rising stem valves preferably comprises a member mounted for movement in a radially-extending bore formed in the key from the outer periphery thereof into the through-bore, the length of the member being selected having regard to the distance between the outer periphery of the key and the inner diameter of the through-bore which accommodates the rising stem, as well as the required projection of the member from the key to be accommodated in the groove in the shroud. Conveniently, the member comprises a plurality of balls able to roll along the radial bore by a distance not greater than one half of the diameter of the balls, and the material of the key at the two ends of the radial bore being deformed slightly so as to prevent the balls leaving the bore.

It is preferred for there to be provided a plurality of similar detent means equi-spaced around the through-bore in the key, but in substantially the same radial plane. Conveniently, two or three such detent means may be provided, spaced at 180° or 120°, as appropriate.

Not infrequently, a rising stem fluid control valve is installed such that the line of movement of the rising stem is other than vertically upwardly. If preferred embodiments of security device of this invention are used with a valve installed such that the stem projects generally downwardly from the valve body, if the valve is operated by rotating the key, the key will fall out of the shroud as the valve becomes closed, because the detent means releases the key at that setting. It is therefore preferred for there to be provided a releasable catch which serves to retain the key in the shroud, even when the valve is closed, until such time as the catch is released. Conveniently, the catch includes an element mounted in the key and spring-urged to a position where the element may engage the groove provided in the shroud, an operating lever being provided to withdraw the element when desired from the groove.

This invention extends to a rising stem valve including a valve body, a nut rotatable with respect to the body and a threaded rising stem interengaged with the nut, in combination with a security device of this invention as described above with the turning member secured to the nut of the valve, and the shroud mounted in a non-rotatable manner on the valve body. Preferably, the shroud is indirectly mounted on the body by means of the turning member itself, the shroud being rotatably mounted on the turning member but held against axial movement with respect thereto, and the shroud having an abutment which engages the valve body to prevent rotation of the shroud with respect to the body.

Three specific embodiments of security devices of this invention and for use with fluid-flow control valves will now be described, these embodiments incorporating various of the preferred aspects of the invention described above.

Referring initially to FIG. 1, the first embodiment of security device of this invention is shown as fitted on a gas ball valve, only part of which is visible in the Figure. The valve comprises a main body portion 10 and a screw-threaded stem 11 projecting from the body portion 10 and connected to the ball (not shown) of the valve within the body portion 10. Such a valve may comprise a known, unmodified form of ball valve used in the gas industry.

The security device comprises a shroud 12 of circular section and provided with a pair of lugs 13 which fit one to each side of the body portion 10 thereby to prevent rotation of the shroud 12 with respect to the body portion 10. The shroud 12 itself has a base plate 14 provided with a bore 15 through which the stem 11 projects and a cylindrical wall 16 upstanding from the base plate 14 surrounding both the stem 11 and a turning member 17 to be described below.

The turning member 17 is provided with a screw-threaded bore 18 inter-engageable with the threads on the stem 11 and has a cylindrical portion 19 which is a close fit but is rotatable within the bore 15 of the base plate 14. The turning member 17 also has a portion which provides a cylindrical surface 21 of greater diameter than the cylindrical portion 19, whereby when the shroud 12 has been mounted on the body portion 10 and the turning member 17 has been threaded on to the stem 11, the shroud 12 cannot be withdrawn until the turning member 17 is unthreaded from the stem 11. Prior to assembly on the valve, the portion 19 is retained within the bore 15 by a circlip 35. The free end of the portion 20 providing the cylindrical surface 21 is formed with a boss 22 upstanding above the cylindrical wall 16 of the shroud 12, the boss 22 having a diametral hole 23 for a tommy-bar (not shown).

The base plate 14 is provided with two bores 24 on a pitch circle the diameter of which is equal to the diameter of the cylindrical surface 21, the bores 24 opening into the face of the base plate 14 remote from the body portion 10. In each bore 24, there is located a pin 25 resiliently biassed by a spring 26 out of its bore 24. The cylindrical surface 21 has two diametrally-opposed recesses 27 of semi-circular cross-section and disposed so that when the turning member 17 is appropriately positioned with respect to the shroud 12, the pins 25 may move under their resilient bias into engagement with the recesses, thereby to prevent rotation of the turning member 17 until the pins 25 have been moved against the spring bias out of the recesses.

The cylindrical surface 21 of the turning member 17 is provided with three hemi-spherical projections 28 part-way between its ends, e.g. in the same radial plane, only two of the projections 28 being visible in FIG. 1. The projections 28 are provided by pressing elements each in the form of a rivet into an appropriately formed radial bore in the portion 20 providing the cylindrical surface 21, the radial bores being accurately formed at known, predetermined arcuately spaced positions.

The operating key 29 for the security arrangement described above comprises a tube 30 the inner diameter of which fits closely over the cylindrical surface 21 and the outer diameter of which fits closely within the internal diameter of the cylindrical wall 16 of the shroud 12. The internal wall of the tube 30 is provided with three recesses 31, extending from one end face of the tube 30, the recesses 31 being accurately positioned and so dimensioned that the key may be fitted over the cylindrical surface 21 with the projections 28 being located one in each recess 31 respectively. Adjacent the other end of the key, a tommy-bar 32 is fitted within a diametral hole 33, to allow manual operation of the key.

A grub-screw 34 is provided in a radial threaded bore in the cylindrical portion 19 of the turning member 17, so as to allow the member 17 to be locked relative to the stem 11 once the member has been threaded thereon. Access to the grub-screw may be obtained through a bore (not shown) extending radially through the base plate 14, and thus only when the turning member 17 is in a particular disposition with respect to the base plate 14. Security may be assisted further by providing two diametrally-opposed grub-screws, so that in order to remove the turning member 17 from the stem 11, the member 17 must be turned through a full 180°, to place first one and then the other grub-screw in register with the bore in the base plate 14, and this clearly requires the use of the operating key 29, so cannot be effected by persons not authorised to do so.

It will be appreciated that with the above-described arrangement, the turning member 17 may be turned by means of a tommy-bar passing through the hole 23 in the boss 22, until such time as the pins 25 engage the recesses 27. Once this has happened, further rotation of the turning member 17 may be effected only upon use of the key 29, by fitting the key over the cylindrical surface 21 of the member 17 and moving the pins 25 out of engagement with the recesses 27 by pushing the key 29 axially towards the base plate 14. Once the pins are clear of the surface 21, the key 29 may be turned to drive the turning member, by way of the engagement of the recesses 31 with the projections 28.

Clearly, the recesses 31 in the key 29 must match the projections 28 provided on the cylindrical surface 21, to enable the key to be fitted over the cylindrical surface 21 and to drive the turning member 17. By altering the relative angular positions of the three projections 28, and if required by providing different numbers of projections 28, a virtually infinite number of combinations may be obtained, each of which requires a special key 29. Furthermore, by providing more bores 24 each having a pin 25, or by providing more recesses 27 in the cylindrical surface 21, locking of the turning member 17 may be effected at more than one position relative to the body portion 10. For instance, the turning member 17 may be locked at both the open and closed positions of the valve. Also, by omitting the boss 22, operation of the arrangement would be possible only upon use of the key 29.

Figure 2:
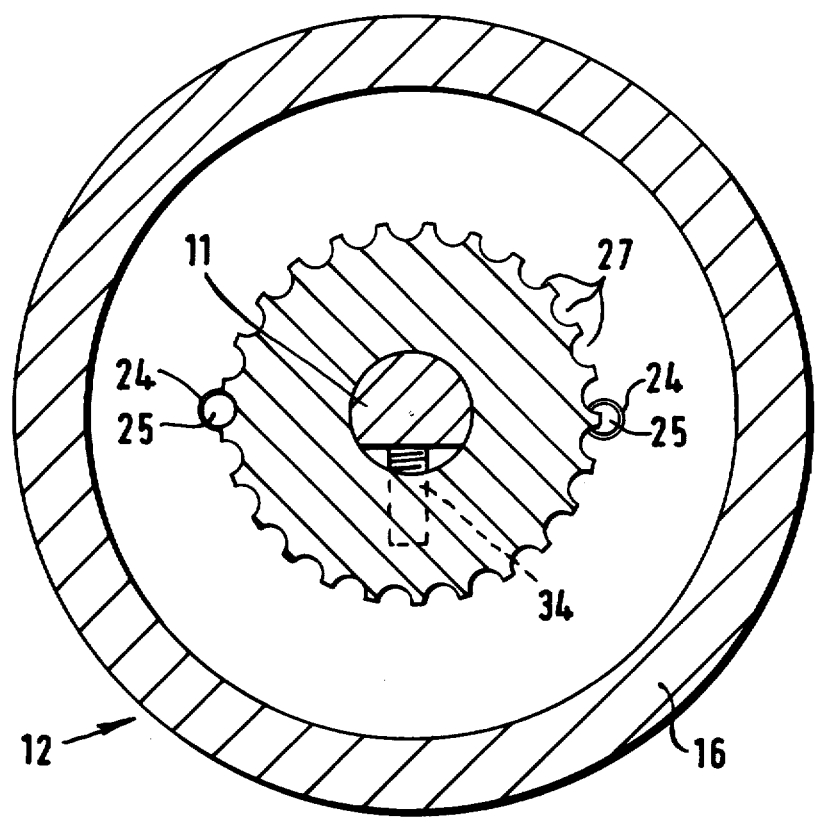
FIG. 2 is a horizontal cross-sectional view through another form of security device generally similar to that of FIG. 1 but capable of being locked in any one of several positions.

FIG. 2 shows a cross-section through a valve fitted with a security device generally similar to that shown in FIG. 1, but modified to allow locking in any one of 50 equi-spaced discrete positions. In this Figure, like parts to those shown in FIG. 1 are given like reference characters, and will not be described again.

The cylindrical surface 21 is provided with 25 equi-spaced recesses 27 each indentical to the two recesses 27 provided in the embodiment of FIG. 1. As before two pins 25 are provided, spring-urged out of diametrally-opposed bores 24.

It will be appreciated that the turning member 17 may be locked against rotation by one of the pins 25 engaging in one of the recesses 27. Because there is an odd number of recesses 27, when one pin is engaged, the other is precisely half-way between a pair of recesses, and thus locking may occur at intervals of 7.2°. Such an arrangement allows the valve to be locked either for security reasons or against vibration at virtually any desired setting. To use such an arrangement, the key 29 is pressed down to maintain the pins 25 free from the recesses 27, and when the valve is in the required position, the key is released and turned very slightly until one of the pins engages in the nearest recess.

Because the turning member is locked at virtually any angular position, the member cannot be turned by a tommy-bar inserted in hole 23. Accordingly, the boss 22 may be omitted from this arrangement.

Figure 3:
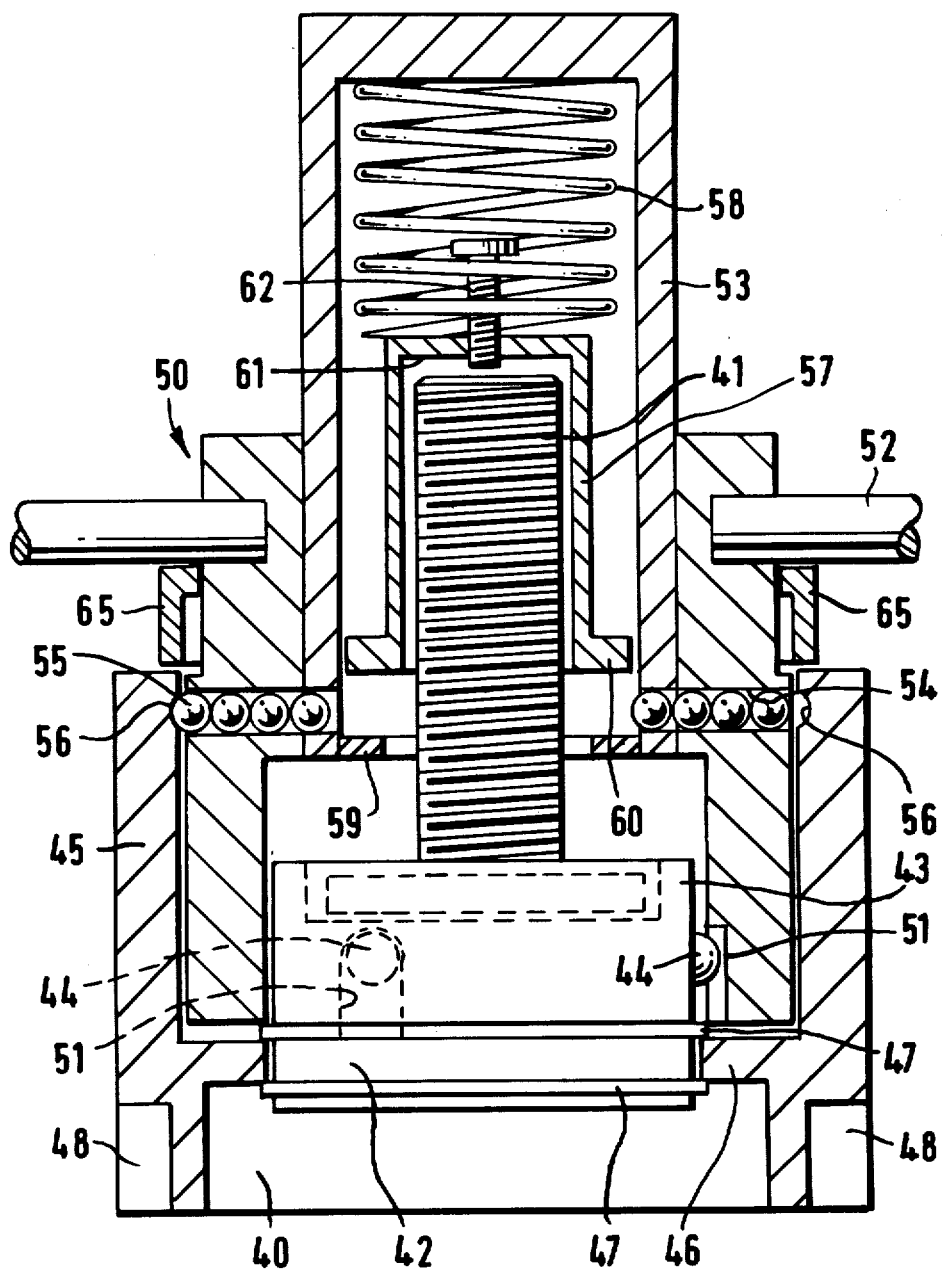
FIG. 3 is a cross-sectional view through a second embodiment of this invention, shown fitted on a rising stem valve and provided with means to prevent withdrawal of the key other than when the valve is fully open.

Referring now to FIG. 3, there is shown a second embodiment of this invention, as fitted to a rising stem valve. In this Figure, a part only of the valve is shown and comprises a body portion 40 in which is mounted a threaded rising stem 41. A nut (not shown) is rotatably mounted on the body portion 40 and the stem 41 is threaded therethrough such that rotation of the nut effects movement of the stem axially, to open or close the valve. Attached to the nut to cause rotation thereof is a turning member 42, provided with a cylindrical surface 43 in which are mounted three hemi-spherical projections 44, e.g. in the same radial plane, in a manner generally similar to that described above with reference to FIG. 1. Surrounding the turning member 42 is a shroud 45 having an internal flange 46 fitted closely around the turning member 42 and held against axial movement with respect thereto by a pair of circlips 47 fitted in annular grooves in the turning member 42. The shroud 45 is formed with recesses 48 adapted to engage suitable parts of the body portion 40 so as to prevent rotation of the shroud 45 relative to the body portion 40.

A tubular operating key 50 is provided with three recesses 51 to allow driving engagement with the projections 44 when the key has been fitted over the cylindrical surface 43 and within the shroud 45, again in a manner generally similar to that described above with reference to FIG. 1. The key is also provided with a tommy-bar 52 to allow it to be rotated by hand.

Press-fitted within the end of the key 50 remote from the recesses 51 is a cover 53, closed at its free end and of sufficient length to allow the stem 41 of the valve to rise fully to open the valve when the key is in position, as shown. Mounted in a pair of diametrally-opposed bores 54, extending through the key 50 and the cover 53, are two detent members each comprising four hardened steel balls 55. The balls are prevented from leaving the bores completely by inward peening of the ends of the bores, but nevertheless the endmost balls may project out of the bores. The internal wall of the shroud 45 is provided with an annular groove 56, positioned such that when the key has been engaged fully with the operating member 42, the detent members may be moved to a position in which the outermost balls fit partially within the groove 56 and so prevent withdrawal of the key 50. To maintain this engagement of the outermost balls with the groove 56 at all times other than when the valve is fully open (that is when the stem projects to the greatest extent from the body portion 40) a sleeve 57 is slidably mounted within the cover 53 and is urged away from the closed end of the cover by means of a spring 58, but is prevented from leaving the cover by means of a washer 59 pressed into the lower end of the cover. The sleeve has an annular abutment 60 for engagement with the innermost balls to drive the detent members outwardly whenever the sleeve is engaged with the washer, so as to hold the key in the position shown. The sleeve is of such a size that the stem may rise therewithin, until the free end of the stem 41 engages the end wall 61 of the sleeve 57. This is arranged to occur as the valve is adjusted to its fully open position. The precise point at which the stem 41 lifts the sleeve 57 may be adjusted by means of a screw 62 threaded into the end wall 61 of the sleeve 57.

When the key is withdrawn, the sleeve 57 will move under the action of spring 58 towards the washer 59 thus urging the detent members outwardly. To re-insert the key, the detent members must be moved inwardly, and this requires the sleeve 57 to be raised within the cover 53. To overcome this difficulty, a sliding collar 65 may be fitted over the main part of the key, which collar slides downwardly as the key is withdrawn, to fit closely over the ends of the bores 54. The detent members are thus restrained from moving outwardly, and the sleeve 57 will move under the action of spring 58 until the abutment 60 contacts the inner ends of the detent members. When the key is re-inserted, the collar 65 bears on the upper end face of the shroud, and then guides the detent members into the bore in the shroud. As soon as the detent members are aligned with the groove 56, they may move outwardly under the action of the sleeve 57, urged by spring 58.

With the above arrangement of collar 65, the washer 59 could be omitted, but it is preferred still to provide the washer, to prevent the sleeve 57 leaving the cover 53 should the collar 65 inadvertently be moved towards the tommy-bar 52 when the key is removed.

Figure 4:
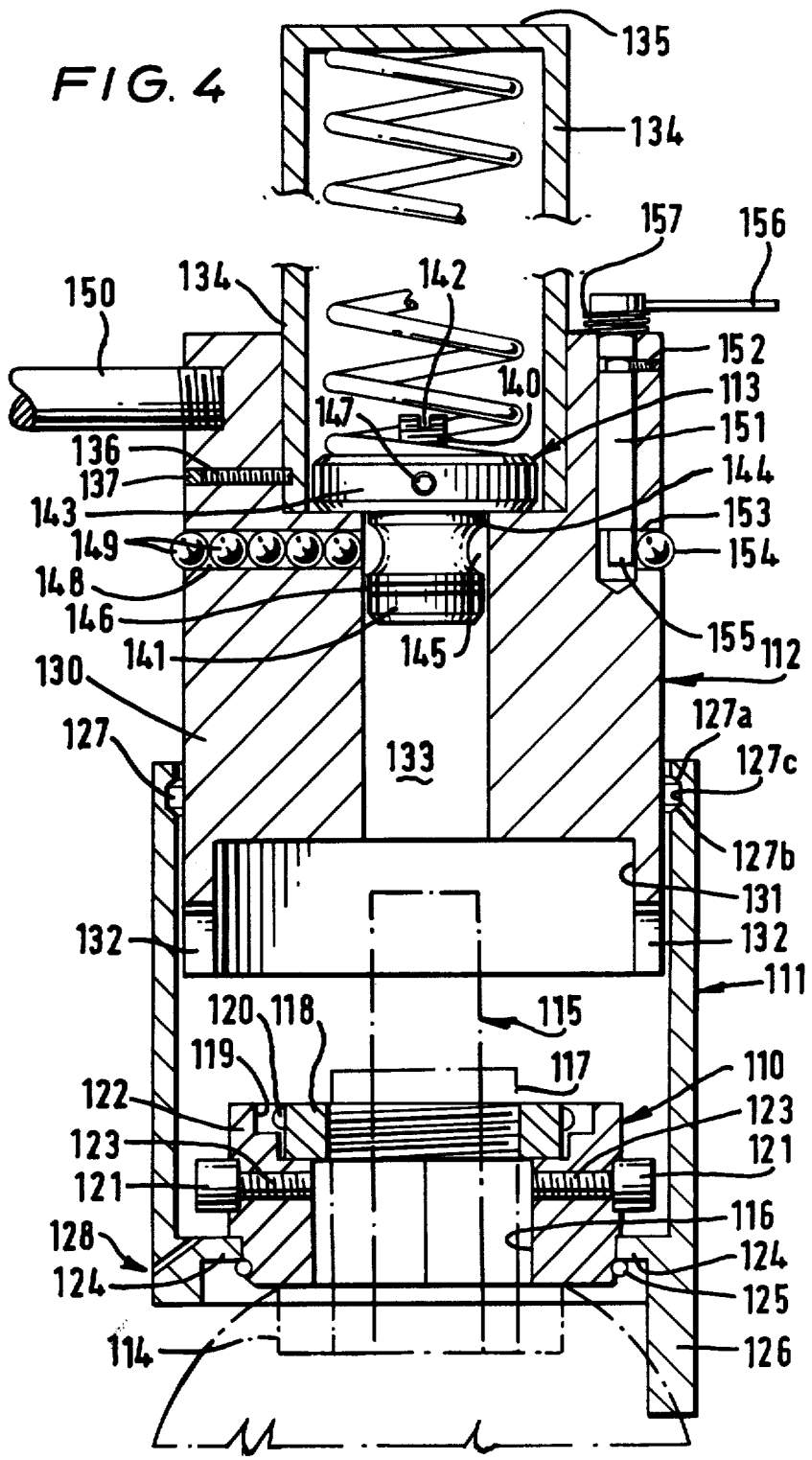
FIG. 4 is a cross-sectional view through a third embodiment of this invention, shown fitted on a rising stem valve and provided with means to prevent withdrawal of the key other than when the valve is fully closed.

FIG. 4 shows another embodiment of a security device of this invention for fitting to a rising stem valve, and comprises a turning member 110, a shroud 111, a key 112, and an adjustable detent drive member 113. As in the preceding embodiment, the device is arranged for attachment to the nut of the valve, which nut is shown diagrammatically at 114 and co-operates with the threaded rising stem 115.

In the present case, the nut 114 has a hexagonal outer profile, and the turning member 110 is provided with a hexagonal opening 116 whereby the turning member 110 may be fitted in a non-rotatable manner over the nut 114. The upper end portion 117 of the nut is externally threaded (normally to allow a handwheel to be secured to the nut) and a ring nut 118 is engaged with the threaded end portion 117 securely to hold the turning member 110 on the nut 114, the ring nut 118 being received in a stepped counter-bore 119 in the turning member 110. The ring nut 118 is provided with at least two radial projections 120 extending from its outer circular periphery, allowing the ring nut 118 to be driven by a tubular tool having an internal diameter substantially the same as that of the ring nut 118 and an outer diameter substantially the same as the larger inner diameter of the counter-bore 119, the tool also having appropriately disposed recesses to accommodate the projections 120. Such a ring nut offers a very high degree of security, and serves to render it exceedingly difficult to remove the ring nut other than with the correct tubular tool.

The tubular member 110 is provided with at least two projections 121 from its outer cylindrical surface 122, which projections in the present embodiment take the form of the hardened steel heads of bolts 123 (for instance, Allen screws) threaded into counter-bored radial bores provided in the turning member 110. Though in the illustrated example, the two projections 121 are arcuately spaced by 180°, e.g. in the radial plane, the projections may be disposed at some other angle and also more than two projections may be provided: in this way, security can be enhanced by coding the relative disposition and number of the projections, as will be explained hereinafter.

The shroud 111 is of cylindrical form surrounds with clearance the turning member 110. The shroud has an inwardly directed flange 124 adjacent its lower end (in the drawing), which flange is rotatably received on a portion of reduced diameter of the turning member 110, the flange abutting a shoulder on the turning member between said reduced diameter portion and the major part of the turning member. The flange is retained on the reduced diameter portion of the turning member by means of a circlip 125, accessible only when the device is not fitted on a valve.

Depending from the shroud 111 below the flange 124, there is provided an abutment 126, which abutment is intended to engage a portion of a rising stem valve when the security device is fitted thereto, so as to restrain rotation of the shroud 111. Adjacent the other end of the shroud and formed in the inwardly facing surface thereof there is provided an annular groove 127, which groove is of symmetrical trapezoidal cross-section, being defined by two substantially linear side walls 127*a* and 127*b*, and a substantially linear base wall 127*c*. Drain holes 128, typically three in number, are provided at the bottom of the shroud, adjacent the flange 124, to allow any liquid entering the shroud to drain away.

When the above-described device is fitted to a rising stem valve, a key such as that illustrated at 112 must be employed to turn the nut 114, thereby to open or close the valve. The key 112 comprises a cylindrical body 130 having at one end a counter-bore 131 the internal diameter of which is substantially the same as the outer diameter of the turning member 110. The wall of the key 112 in the region of the counter-bore 131 is provided with two recesses 132, the size and angular disposition of which are suitable for accommodating the projections 121. Thus, the key 112 must specially be adapted to suit a particular turning member 110 and cannot be used in conjunction with a security device having its projections 121 coded differently, either in number or angular disposition.

Extending axially through the body 130 of the key 112 is a through-bore 133 the diameter of which is such that the rising stem 115 of the valve may be received therein. The upper end of the through-bore 133 is also counter-bored, and a tubular sleeve 134 is positioned therein, the tubular sleeve being closed at its upper end 135. The sleeve 134 is locked in position by means of a grub-screw 136, and a lead plug 137 is driven into the threaded bore in the body 130 accommodating the grub-screw 136, so as to prevent access to that screw once it has been tightened home.

The adjustable detent drive member 113 comprises a first component having a threaded stub 140 extending from a head 141 and provided with a screw-driver slot 142 at its free end; and a second component comprising a cylindrical nut 143 threadingly engaged with the stub 140, the nut 143 having a boss 144 formed with an annular channel 145 which channel is of arcuate cross-sectional shape. Between the head 141 and the boss 144, there is provided at least one spacer 146. A radially-extending grub-screw 147 is provided in the nut 143 to lock the first and second components against relative turning movement.

The adjustable detent drive member 113 is partially positioned in the through-bore 133, with the larger diameter portion of the second component 143 resting on the base of the counter-bore in the body 130, a spring 147a being located between nut 143 and the end 135 of the sleeve 134, to urge the detent drive member to the illustrated position. When so located, the channel 145 is in alignment with at least one radial bore 148 provided in the body 130, in which bore is located a plurality of hardened steel balls 149. The ends of the bore 148 are peened over, so as to prevent the balls 149 leaving the bore, but the balls may project radially by a limited extent either from the outer surface of the body 130 or into the through-bore 133.

The length of the body 130, between the bore 148 and the counter-bore 131, is such that when the key 112 is fully engaged with the turning member 110, the bore 148 is in the same radial plane as the annular groove 127 in the shroud 111. Moreover, during the initial installation of the security device on a rising stem valve, the axial dimension of the spacer 146 of the adjustable detent drive member 113 is selected to be such that with the valve fully closed (and thus with the upper free end of the rising stem 115 closest the nut 114) the head 141 engages the upper end of the rising stem 115 and the nut 143 also engages the base of its associated counter-bore: the channel 145 is thus aligned with the bore 148. The key therefore may freely be inserted into or lifted out of the shroud 111, because the innermost ball 149 may be received in the channel 145 of the detent drive member 113, and the outermost ball 149 will not project from the key. However, upon engagement of the key with the turning member 110 and rotation thereof—for instance by means of a tommy-bar 150 extending radially from the key 112—in such a sense as to commence opening the valve, the rising stem 115 will start to rise and thus will lift the detent drive member 113. This action causes the balls 149 to be moved radially outwardly, moving the outermost ball 149 into the annular groove 127 in the shroud. Thereafter, the key 112 is held locked in the shroud 111, because the balls 149 will be held in this disposition by the spacer 146, the head 141, or the rising stem 115 itself. Only when the valve has again been fully closed can the balls 149 move radially inwardly, thus freeing the key from the shroud 111.

Though in the illustrated embodiment, there is but one bore 148, it is preferred for there to be at least two such bores, each accommodating balls 149, which bores should then be diametrically opposed. This is to ensure that the outermost ball of at least one of the bores 148 will be engaged in the annular groove 127 when the rising stem 115 is in register with the bores 148, notwithstanding the thread-form of the rising stem itself and the possible reception of one innermost ball 149 in a trough in that thread-form. Depending upon the precise type of thread-form, it may be necessary to provide more than two such bores, at appropriate angular dispositions.

The key 112 also has a releasable catch arrangement, serving to prevent the key 112 being withdrawn from the shroud 111 even when the channel 145 is aligned with the bore 148, until such time as an operator releases the catch. The catch arrangement comprises a shaft 151 rotatably located in a bore extending parallel to the axis of the key 112, the shaft 151 being held against axial movement by means of a screw-threaded peg 152 extending into a groove formed in the shaft. Adjacent the lower end of the shaft 151 and in the same radial plane as the bore 148, there is provided a bore 153 in which there is located a ball 154, the outer end of the bore 153 being peened over to prevent the ball 154 moving radially out of the bore. The free end of the shaft 151 is provided with a cam member 155, which when in the illustrated position urges the ball 154 to project from the outer surface of the key. However, on rotating the shaft 151, the cam member 155 allows the ball 154 to move radially inwardly. The upper end of the shaft 151 is provided with a lever 156 for effecting rotation of the shaft 151, and a torsional coil spring 157 is disposed to urge the shaft to such an angular position that the ball 154 is driven radially outwardly by the cam member 155.

It will be appreciated that the lever 156 of the catch arrangement described above must be operated either to fit the key 112 into the shroud 111, or to release the key from the shroud, and when the lever 156 is released once the key has been fitted into the shroud, the shaft 151 will rotate such that the cam member 155 drives the ball 154 radially outwardly into the annular groove 127. Such a catch arrangement is particularly advantageous when the security device is fitted on a rising stem valve the stem of which projects generally downwardly, because then the key 112 will not fall away from the valve other than when the catch arrangement is operated intentionally.

The annular groove 127 is given the particular cross-sectional profile mentioned above in order that should an attempt be made to remove the key from the shroud other than when the valve is fully closed and the catch arrangement operated, the outermost ball 149 and/or the ball 154 will engage the wall 127a of the annular groove 127 at a point spaced from the junction of the inner circumferential wall of the shroud 111 and the wall 127a of the groove 127. This serves to prevent damage to said junction, which might otherwise occur were the groove to have for example an arcuate profile, the radius of which corresponds to that of the balls.

It will be appreciated that the arrangement of projections on a cylindrical surface as described above with reference to any of FIGS. 1 to 4 enables operation of the respective security device only by those possessing the right key. Forcing of the device is extremely difficult, because the operating member is principally cylindrical and only relatively small projections are provided, to which must be applied the torque. Also, because the shroud surrounds completely the cylindrical surface, access to the cylindrical surface by any conventional tool is almost impossible. The arrangement of FIG. 1 furthermore allows operation of an associated valve from one position to another predetermined position by anyone, though once moved to the predetermined position, the valve cannot be adjusted any further unless the correct key is employed. Security may be enhanced further by appropriate shaping of the lower part of the shroud, so as to cover removable parts of the valve bodies, which parts could possibly be removed to allow unauthorised operation of the valve.

What I claim is:

1. A security arrangement for a rotatable member of a machine element which projects from the machine element, which security arrangement is adapted to be fitted to the machine element and comprises:

a rotatable stub for attachment to the rotatable member to impart rotational drive thereto, means for attaching the stub to the rotatable member and for securing the so-attached stub against axial movement with respect to the machine element, the stub defining an external cylindrical surface and there being at least two arcuately spaced projections upstanding radially from said cylindrical surface, a shroud adapted to surround with clearance said cylindrical surface of the stub and said projections upstanding therefrom, and means for releasably attaching the shroud to the rotatable stub for permitting relative rotational movements therebetween while securing the shroud against axial movement with respect to the stub, the shroud being provided with means to secure said shroud against rotation with respect to said machine element when said security arrangement is fitted thereto, and said means for attaching the stub to the rotatable member and for securing the so-attached stub against such axial movement as well as said means for releasably attaching the shroud to the stub being located internally of the shroud, whereby said stub may be engaged by an operating key having a cylindrical portion defining a bore which may fit over said cylindrical surface, said key also having wall portions defining recesses angularly spaced for receiving said projections and the outer diameter of said cylindrical portion of the key being sufficiently small to fit within said shroud, so that rotation of the stub may be effected by the key driving the stub by the interengagement of at least one of the projections with at least one corresponding wall portion of said key defining at least one corresponding recess receiving said projection.

2. A security arrangement as claimed in claim 1, in which said stub is provided with a portion defining a cylindrical wall and said shroud defines a circular opening by means of which said shroud is mounted directly on said stub in a relatively rotatable manner, said shroud being fitted on to said cylindrical wall from the end of the shroud remote from the end thereof engaged by said key when fitted in said shroud, and there being a member to retain said shroud on said cylindrical wall whereby said shroud may be removed from said stub only after removal of said security arrangement from said machine element.

3. A security arrangement as claimed in claim 1, in which locking means are provided to lock said rotatable stub against rotation relative to said shroud when the stub has been turned to a particular disposition with respect to the shroud, which said means are releasable only upon actuation by said driving key.

4. A security arrangement as claimed in claim 3, in which said rotatable stub is provided with a boss projecting axially beyond the shroud when mounted on the machine element, which boss is formed so as to be drivable by a conventional tool until said stub has been turned to a position where the stub is locked by the locking means.

5. A security arragement as claimed in claim 3, in which said locking means comprises at least one pin positioned in a bore extending parallel to the axis of the rotatable stub and provided in an appropriate part of said shroud, said pin being resiliently biassed by a spring out of its bore for engagement in a recess formed in the cylindrical surface when the rotatable stub has been rotated to the correct relative disposition.

6. A security arrangement as claimed in claim 5, in which a plurality of closely-spaced recesses are provided around the cylindrical surface, so that the pin may engage in any one recess, to allow locking of the stub at any one of a number of possible positions.

7. A security arrangement as claimed in claim 1, in which said rotatable stub is formed as a turning member defining said cylindrical surface which turning member can be turned through a plurality of turns between two extreme settings, and there are means to prevent withdrawal of said driving key other than when the turning member is at one or the other particular extreme setting.

8. A security arrangement as claimed in claim 7, in combination with a machine element in the form of a rising stem fluid-flow control valve, the rotatable stub comprising a nut for the rising stem and the key having a through-bore in which the rising stem can be accommodated as the valve is opened, in which said key is provided with a movable detent located in a generally radial bore through a side wall of said key and engageable in an annular groove in the internal wall of said shroud, there being detent operating means which maintains the detent engaged with the annular groove when said key is fitted over the cylindrial surface and the valve is not at said extreme setting but allows the detent to move out of engagement with the groove when the stem is at its said extreme setting.

9. A security arrangement as claimed in claim 8 and in which said key is to be removable when said valve is fully open and thus when the rising stem is fully extended from the valve, wherein said detent operating means comprises a sleeve fitting over the stem of the valve and biassed to the position in which it maintains the engagement of said detent with said annular groove in the shroud, the end of said sleeve nearer the free end of the rising stem of the valve being provided with an abutment face for engagement with the free end of the stem of the valve so that as said stem rises it will engage and lift the sleeve to move the sleeve to a position in which said detent may move out of said groove in the shroud.

10. A security arrangement as claimed in claim 9, in which means are provided to maintain said detent in a position in which the key may be fitted within the shroud until the key has properly been engaged with the cylindrical surface of the stub.

11. A security arrangement as claimed in claim 8, and in which said key is to be removable only when said valve is fully closed and then when the rising stem is fully retracted back towards the valve body, wherein there is provided a detent drive member which has a section able to fit into the through-bore in said key, said section having a first portion of substantially the same diameter as the stem of the valve and a second portion defining an annular channel for receiving said detent means when not projecting beyond the outer periphery of the key, said detent drive member being adjustable to allow pre-setting of the distance between said annular channel and the end face of said section thereof, the arrangement being such that when the device is fitted to a rising stem valve, said end face of the detent drive member is engaged and moved by the rising stem as said turning member is operated by said key to open the valve from its fully closed setting, thereby moving the detent means to restrain withdrawal of the key from the shroud.

12. A security arrangement as claimed in claim 11, in which said detent drive member comprises a first component in the form of a threaded stub having formed at one end thereof a head adapted to fit within said through-bore in the key and to be engaged by the free end of the rising stem of the valve, and a second component having a screw-threaded bore engaged with said threaded stub of said first component and having a boss which also fits within the through-bore in the key, the boss defining said annular channel of the detent drive member, a spacer of an appropriate thickness being provided between said head at the end of the first component and said boss of the second component, to effect said adjustment.

13. A rising stem valve including a valve body, a nut rotatable with respect to the body and a threaded rising stem interengaged with the nut, in combination with a security device according to claim 9, with said turning member secured to the nut of the valve, and said shroud mounted in a non-rotatable manner on the valve body.

14. A rising stem valve including a valve body, a nut rotatable with respect to the body and a threaded rising stem interengaged with the nut, in combination with a security device according to claim 11, with said turning member secured to the nut of the valve, and said shroud mounted in a non-rotatable manner on the valve body.

15. A security arrangement as claimed in claim 1, in which the means for attaching the stub to the rotatable member and for securing the so-attached stub against axial movement with respect to the machine element are releasable means.

16. A security turning arrangement for a rotatable member of a machine element, which arrangement comprises a stub for attachment to said rotatable member to impart rotation drive thereto, the stub defining axially adjacent first and second external cylindrical surfaces and there being at least two arcuately spaced projections upstanding radially at preset positions in the same radial plane from said first cylindrical surface, and a shroud having a circular opening by means of which said shroud is rotatably mounted on said second cylindrical surface of the stub and which shroud is adapted to surround with clearance said first cylindrical surface of the stub and said projections upstanding therefrom, the shroud being provided with means to restrain said shroud against rotation with respect to said machine element when said stub is attached to the rotatable member of the machine element, said security arrangement further comprising an operating key having a cylindrical portion defining a bore which may fit over said first cylindrical surface of said stub, said key also having wall portions defining recesses angularly spaced for receiving said projections and the outer diameter of said cylindrical portion of the key being sufficiently small to fit within said shroud, so that rotation of the stub may be effected by the key driving the stub by the interengagement of the projections with the wall portions of said key defining the recesses receiving said projections.

17. A security arrangement as claimed in claim 16, in which said shroud is fitted onto said second cylindrical wall of said stub from the end of the stub remote from the end thereof engaged by said key when fitted in said shroud, there being a member to retain said shroud on said cylindrical wall whereby said shroud may be removed from said stub only after removal of said security arrangement from said machine element by releasing said stub from the rotatable member.

* * * * *